Jan. 9, 1945.  W. P. HILL  2,367,121
COMBINED PUNCH AND EXTRUDING TOOL
Filed Nov. 9, 1942

Inventor
WALTER P. HILL
By Whittemore Hulbert & Belknap
Attorneys

Patented Jan. 9, 1945

2,367,121

UNITED STATES PATENT OFFICE 2,367,121

COMBINED PUNCH AND EXTRUDING TOOL

Walter P. Hill, Detroit, Mich., assignor to Calumet and Hecla Consolidated Copper Company, Calumet, Mich., a corporation of Michigan Application November 9, 1942, Serial No. 465,061

12 Claims. (Cl. 153—25)

This invention relates to a combined punch and extruding tool.

One of the principal objects of this invention is to provide a tool rendering it possible to form a length of tubing with one or more openings through the side wall thereof and with an annular flange surrounding each opening. In accordance with this invention, coacting tool parts are respectively supported within the tube and exteriorly of the tube for successively punching an opening through the tube wall and for extruding the material surrounding the opening to form an annular flange. These operations are effected in rapid succession with the minimum amount of manipulation and, as a result, enable manufacturing tubes of the above type on a production basis.

Another object of this invention is to provide a tool of the above general type capable of simultaneously punching a series of openings through one side of the tube and thereafter simultaneously extruding the material surrounding the openings to form an annular attaching flange at each opening.

Still another object of this invention is to provide a tool having an extruding part adapted to readily telescope within the length of tubular stock and having a punch part exteriorly of the stock adapted to cooperate with the extruding part to form an opening through the adjacent portion of the stock wall.

A further object of this invention is to provide a tool of the character set forth wherein the extruding part is normally positioned to enable the tubular stock to be readily telescoped on the extruding part and wherein this part is returned to its normal position by the punch immediately after the extruding operation to enable removal of the tubular length of stock from the extruding part.

The foregoing, as well as other objects, will be made more apparent as this description proceeds, especially when considered in connection with the accompanying drawing, wherein.

Figure 1:
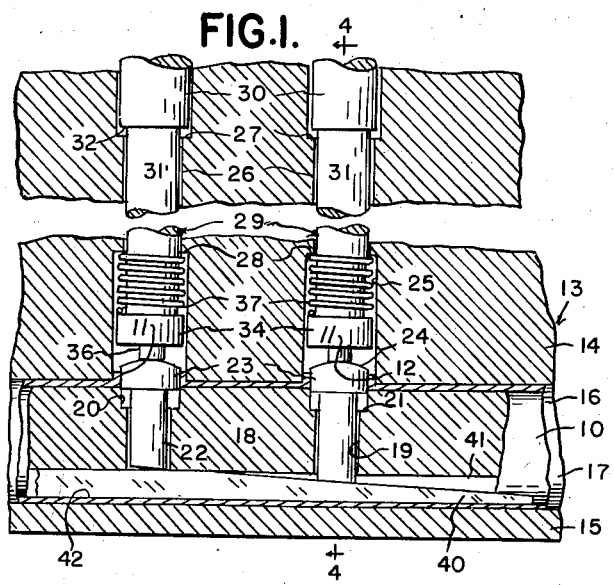
Figure 1 is a longitudinal sectional view through a tool constructed in accordance with this invention and taken substantially on the line 1—1 of Figure 4.

Referring now more in detail to the drawing, it will be noted that the reference character 10 indicates a length of tubular stock having a plurality of openings 11 therethrough. The openings 11 are spaced from each other in the direction of length of the stock and each opening is surrounded by an annular flange 12 of sufficient length to enable a conduit or tube (not shown) to be welded, soldered or otherwise secured thereto.

Figure 3:
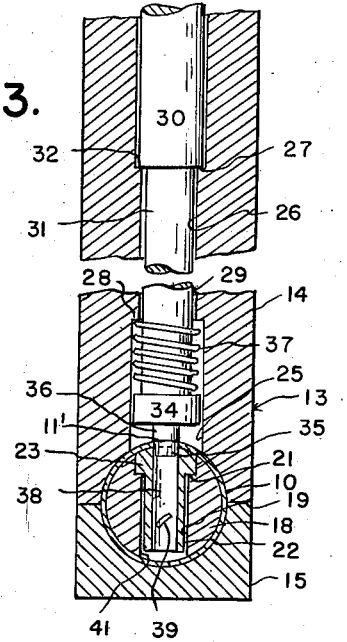
Figure 3 is a cross sectional view showing the punch in its operative position.

The openings 11 and the flanges 12 are formed in the tubular stock by a tool 13. The tool 13 comprises a holder having cooperating clamping parts 14 and 15 supported in any suitable manner, not shown, for relative movement toward and away from each other. The clamping parts are respectively formed with recesses 16 and 17 in the adjacent surfaces thereof. These recesses extend for the full length of the clamping parts and cooperate with one another in the positions of the parts shown in Figure 3 to clamp a length of tubing 10.

The length of tubular stock 10 is internally supported by a mandrel 18 capable of being readily telescoped within the stock 10 and having a plurality of bores 19 extending transversely therethrough at longitudinally spaced points. The cross sectional contour of the mandrel 18 preferably corresponds to the cross sectional contour of the stock and, in the present instance, is cylindrical in order to effectively internally support the stock. However, it should be understood that if the length of tubular stock is polygonal in cross section the mandrel 18 will also be polygonal in cross section so as to engage the inner surfaces of the tubular stock. The number of bores 19 corresponds to the number of openings 11 specified in the tube 10 and the spacing of the bores also corresponds to the desired spacing of the openings 11. The upper end portion of each bore 19 is counterbored to form an enlargement 20 and an annular shoulder 21.

A plug 22 is slidably supported in each bore 19 and the outer or upper end of the plug is formed with an enlargement 23 having a surface 24 curved on a radius corresponding to the radius of the mandrel 18. The enlargements 23 on the plugs 22 respectively slidably fit in the counterbored portions 20 of the bores 19 and the shoulders formed by these enlargements respectively abut the shoulders 21 on the mandrel to position the plugs in their respective bores with the outer curved surfaces 24 flush with the external surface of the mandrel 18. When the plugs are in the positions determined by the shoulders, a length of tubular stock may be readily telescoped on or removed from the bar.

The clamping part 14 is also formed with a plurality of bores 25 respectively aligned with the bores 19 and having reduced intermediate portions 26 forming axially spaced annular shoulders 27 and 28. A punching device 29 is supported in each bore 25 in the manner clearly shown in Figures 2 and 3 of the drawing. In detail, each punching device comprises a rod 30 having a reduced portion 31 slidably engaging the reduced portion 26 of one of the bores 25 and forming a shoulder 32 engageable with the shoulder 27 to limit downward travel of the rod 30 relative to the clamping part 14. The lower end of each rod 30 is threadedly engaged by a part 33 having an enlarged portion 34 slidably supported in the lower end of the bore 25 and having a punching portion 35 connected to the enlargement 34 by a portion 36 of slightly greater diameter than the punch 35.

The punching devices 29 are normally supported by the shoulders 27, 32 with the punching portions 35 extending into the recess 16 in the top clamping part 14 and, if desired, springs 37 may be provided for yieldably holding the devices in this position. In the event springs 37 are provided, the latter are respectively mounted on the rods 30 between the shoulders 28 and the enlargements 34.

Figure 2:
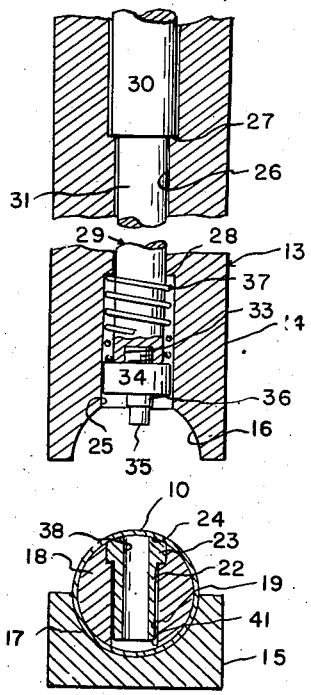
Figure 2 is a cross sectional view through the tool showing the parts in their retracted positions.

Assuming that the parts of the tool are in the relative positions shown in Figure 2, it will be noted that as the clamping part 14 is moved toward the part 15 to clamp the length of tubular stock 10 therebetween, the lower ends of the punches 35 contact the stock. As a result, continued movement of the clamping part 14 in a direction toward the part 15 causes the punching devices to move upwardly against the action of the springs 37. The punching devices are then simultaneously moved in a downward direction relative to the clamping part 14 to force the punches 35 through the registering portions of the stock and form openings 11' in the adjacent portions of the tube wall.

Attention is called to the fact at this time that the plugs 22 are formed with axially extending bores 38 therethrough directly in alignment with the respective punches 35 and having a sufficient internal diameter to receive the punches 35 during the punching operation. These bores are tapered outwardly from the upper ends thereof to enable the "slugs" to fall by gravity through the bores.

Upon completion of the punching operation, the plugs 22 are simultaneously moved upwardly by means to be described relative to the clamping part 15 and the enlarged heads 23 serve to extrude the stock surrounding the punched openings into the lower ends of the bores 25 in the clamping part 14. The stock extruded by the heads 23 on the plugs 22 is forced by the latter against the inner surfaces of the bores 25 and forms the annular flanges 12 previously described as surrounding each opening 11 through the tubular stock. It is important to note that during the extruding operation, the shoulders formed by the enlarged portions 36 on the punches respectively engage the enlargements 23 on the plugs 22 so that upward movement of the plugs to extrude the stock also compresses the springs 37. As a result, when the clamping part 14 is raised at the termination of the extruding operations, the plugs 22 are returned to their normal positions in the bores 19 by the springs 37.

It is pointed out at this time that while the springs 37 are preferred in order to insure instantaneous return of the extruding plugs 22, nevertheless, these springs are not absolutely essential because the weight of the punching devices is sufficient to return the plugs subsequent to the extruding operation. This is an important feature of the tool because it insures removal of the stock from the bar 18 without interference from the plugs 22.

Figure 4:
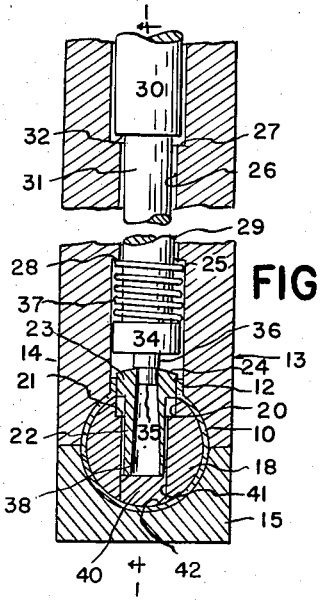
Figure 4 is a sectional view taken on the line 4—4 of Figure 1.

The plugs 22 are simultaneously raised to effect the extruding operations by a bar or pin 40 movable longitudinally of the mandrel 18 in a groove 41 formed in the bottom side of the bar. The top surface of the bar 40 is tapered in the manner shown in Figure 1 of the drawing and engages the lower ends of the plugs 22 so that movement of the bar 40, in an inward direction longitudinally of the groove 41 or mandrel 18, raises the plugs 22 as a unit against the action of the springs 37 to effect the extruding operation. The bottom surface 42 of the pin is transversely curved on a radius corresponding to the radius of the inner surface of the tubular stock and slidably engages the latter surface in the manner clearly shown in Figures 2 to 4, inclusive, of the drawing.

It has been previously stated that the "slugs," resulting from the punching operations, fall through the bores 19 in the plugs 22. These "slugs" actually fall into the space defined by the groove 41 in the mandrel 18 and the registering portion of the tubular stock. Inasmuch as the bar 40 is in its retracted position during the punching operations, it follows that the "slugs" are deposited in the groove in advance of the pin and are ejected by the pin as the latter is advanced to effect the extruding operations.

It is important to note that the construction of the tool 13 is such as to enable forming relatively large openings in the tube wall. In fact, the unique construction of the tool renders it possible to form openings having a diameter approaching the inside diameter of the tube.

What I claim as my invention is:

1. A combined punch and extruding tool comprising a cylindrical mandrel insertable into a length of tubing and having the external surface engageable with the inner surface of the tube wall said mandrel also having a transverse bore therethrough, a plug having a bore extending axially therethrough, said plug being reciprocably mounted in said transverse bore through the mandrel and having the outer end curved on a radius corresponding to the radius of curvature of the outer surface of the mandrel, means for positioning the plug in the transverse bore of the mandrel with the curved surface of the plug flush with the exterior surface of the mandel, a punch cooperating with said bore extending axially through the plug to shear out the registering portion of the tube wall and form an opening therethrough, and a member guided by said mandrel for movement longitudinally thereof and engageable with the inner end of the plug to move the latter radially outwardly sufficiently to extrude the material surrounding the punched opening in the length of tubing.

2. A combined punch and extruding tool comprising a cylindrical mandrel insertable into a length of tubing and having the external surface engageable with the inner surface of the tube wall, a plug reciprocably mounted in a transverse bore through the mandrel and having the outer end curved on a radius corresponding to the radius of curvature of the outer surface of the mandrel, means for positioning the plug in the transverse bore of the mandrel with the curved surface of the plug flush with the exterior surface of the mandrel, a punch supported exteriorly of the tube for movement toward and away from the plug, a bore extending axially through the plug and cooperating with the punch upon movement of the latter toward the plug to punch an opening through the adjacent portion of the tube wall, a member movable with the punch and having a bore registrable with the plug, and means for moving the plug radially outwardly into the bore in said member to extrude the material surrounding the punched opening into the latter bore and against the inner surface of said bore.

3. A combined punch and extruding tool comprising a cylindrical mandrel insertable into a length of tubing and having the external surface engageable with the inner surface of the tube wall, a plug reciprocably mounted in a transverse bore through the mandrel and having the outer end curved on a radius corresponding to the radius of curvature of the outer surface of the mandrel, means for positioning the plug in the transverse bore of the mandrel with the curved surface of the plug flush with the exterior surface of the mandrel, a punch supported exteriorly of the tube for movement toward and away from the plug, a bore extending axially through the plug and cooperating with the punch upon movement of the latter toward the plug to punch an opening through the adjacent portion of the tube wall, means movable lengthwise of the mandrel and engageable with the plug to move the latter radially outwardly sufficiently to extrude the material surrounding the punched opening in the tube in an outward direction, and spring means cooperating with the punch for returning the plug to its innermost position and thereby enable withdrawal of the tube from the mandrel.

4. A combined punch and extruding tool comprising a mandrel insertable into a length of tubular stock and having the outer surface engageable with the inner surface of the tube wall, a punch supported exteriorly of the tube for movement toward and away from the tube, a plug reciprocably mounted in a transverse bore through the mandrel and having a bore therethrough coacting with the punch to shear out the registering portion of the tube wall to form an opening therethrough upon movement of the punch in a direction toward the tube, a groove extending longitudinally of the mandrel for receiving the slug punched from the stock, and a member movable along the groove for ejecting the slug and having a portion engageable with the plug to move the latter outwardly sufficiently to extrude the material of the tube surrounding the opening therethrough.

5. A combined punch and extruding tool comprising a cylindrical mandrel insertable into a length of tubing and having the external surface engageable with the inner surface of the tube wall, said mandrel having a transverse bore therethrough and having a longitudinally extending groove registering with the bore, a punch supported exteriorly of the tube in alignment with the transverse bore in the mandrel for movement toward and away from the latter, a plug reciprocably mounted in the transverse bore and having the end adjacent the punch curved on a radius corresponding to the radius of curvature of the outer surface of the mandrel, cooperating engaging means on the plug and mandrel for normally positioning the plug with the curved end flush with the outer surface of the mandrel, a bore extending axially through the plug for cooperation with the punch to form an opening through the adjacent portion of the tube wall and for conveying the slug to the groove in the mandrel, and means for ejecting the slug including a member movable along said groove and having a portion engageable with the inner end of the plug for moving the latter radially outwardly sufficiently to extrude the material surrounding the punched opening in the tube.

6. A combined punch and extruding tool comprising a mandrel insertable into a tube and having a plurality of transverse bores spaced from each other longitudinally of the mandrel, a plug slidably supported in each bore and having a bore extending axially therethrough, a punch supported opposite each plug and cooperating with said plugs to punch out the adjacent portions of the tube wall to form openings therethrough, and means for subsequently moving the plugs radially outwardly to extrude the material of the tube surrounding the punched openings.

7. A combined punch and extruding tool comprising a holder having a part provided with a semi-circular recess of sufficient dimension to receive a portion of a length of tubular stock and having a transverse bore communicating with the recess, a mandrel insertable into the length of tubular stock and having a transverse bore therethrough registering with the bore in the holder part, a punch carried by the holder part and supported in the bore in the holder part for limited movement relative thereto, a plug reciprocably mounted in the bore formed in said mandrel and having an axially extending bore cooperating with the punch to shear out the registering portion of the tube wall to form an opening therethrough, and means for moving the plug radially outwardly to extrude the material surrounding the punched opening into the bore formed in the holder part.

8. A combined punch and extruding tool comprising a holder having a part provided with a semi-circular recess of sufficient dimension to receive a portion of a length of tubular stock and having a transverse bore communicating with the recess, a mandrel insertable into the length of tubular stock and having a transverse bore therethrough registering with the bore in the holder part, a plug reciprocably mounted in the bore formed in said mandrel and having the outer end curved on a radius corresponding to the radius of curvature of the outer surface of the mandrel, cooperating engaging means on the plug and mandrel for positioning the plug with the curved end flush with the outer surface of the mandrel, a punch supported in the bore in said holder part for limited movement relative thereto and adapted to cooperate with the bore through the plug to punch an opening through the adjacent portion of the tube wall, means for moving the plug radially outwardly to extrude the material surrounding the punched opening into the bore formed in the holder part, and spring means acting on the punch to return said punch to the position determined by the cooperating engaging means aforesaid.

9. A combined punch and extruding tool comprising a holder having a pair of elongated clamping parts relatively movable toward and away from each other and having semi-circular recesses in adjacent surfaces of the parts registrable with each other when the parts are relatively moved toward one another to form a bore for receiving a length of tubular stock, one of the parts having a transverse bore communicating with the semi-circular recess therein, a punch carried by said one part and supported in the transverse bore for movement relative to the latter part, a cylindrical mandrel adapted to telescope within the length of tubular stock and having a transverse bore registrable with the transverse bore in said one part of the holder, a plug reciprocably mounted in the transverse bore in the mandrel and having a transverse bore adapted to coact with the punch to form an opening through the adjacent portion of the tube wall, and means movable lengthwise of the mandrel and engageable with the plug to move the latter outwardly and extrude the material surrounding the punched opening in the tube wall outwardly into the transverse bore formed in the said one clamping part.

10. A combined punch and extruding tool comprising a holder having a pair of elongated clamping parts relatively movable toward and away from each other and having semi-circular recesses in adjacent surfaces of the parts registrable with each other when the parts are relatively moved toward one another to form a bore for receiving a length of tubular stock, one of the parts having a plurality of transverse bores spaced from each other in the direction of length of the holder and communicating with the semi-circular recess formed in the latter part, a cylindrical mandrel adapted to telescope in the length of tubular stock and having transverse bores respectively registrable with the transverse bores in said one clamping part, a plug reciprocably mounted in each of the bores in said mandrel and having an axially extending bore, a plurality of punches respectively slidably supported in the transverse bores in said one clamping part and adapted to cooperate with the bores in said plugs to punch openings through the tube wall, and means for simultaneously moving the plugs radially outwardly to extrude the material surrounding the punched openings into the bores in said one clamping part.

11. A combined punch and extruding tool comprising a cylindrical mandrel insertable into a tube and having a plurality of transverse bores spaced from each other longitudinally of the mandrel, a plug reciprocably mounted in each bore and having the outer end curved on a radius corresponding to the radius of curvature of the exterior surface of the mandrel, cooperating engaging means on the mandrel and plugs for positioning the plugs with the curved outer ends flush with the outer surface of the mandrel, a punch supported opposite each plug and coacting with axially extending bores in the plugs to shear out registering portions of the side wall of the tube to form openings therethrough, means for simultaneously moving the plugs radially outwardly to extrude the material surrounding the punched openings in an outward direction, and means cooperating with the punches to return the plugs to the positions determined by the cooperating engaging means aforesaid.

12. A combined punch and extruding tool comprising a mandrel insertable into a length of tube and having a transverse bore therethrough, an extruding member reciprocably mounted in said transverse bore and centrally apertured to form a die, said member being normally held with the face of the die in contact with the inner surface of the tube, an external punch cooperating with said die to shear out the metal of said tubing in registration therewith and to form an aperture therethrough, and means for forcing said extruding member outward to stretch and extrude the metal surrounding said opening and to form thereof an outwardly extending annular flange.

WALTER P. HILL.